(12) United States Patent
Klauer

(10) Patent No.: US 8,231,299 B2
(45) Date of Patent: Jul. 31, 2012

(54) LUMBER STORAGE AND STACKING PROTECTION DEVICE

(76) Inventor: David Klauer, Denton, TX (US)

( * ) Notice: Subject to any disclaimer, the term of this patent is extended or adjusted under 35 U.S.C. 154(b) by 535 days.

(21) Appl. No.: 12/218,204

(22) Filed: Jul. 14, 2008

(65) Prior Publication Data
US 2009/0057243 A1 Mar. 5, 2009

Related U.S. Application Data

(60) Provisional application No. 60/967,021, filed on Sep. 4, 2007.

(51) Int. Cl.
*A47B 96/00* (2006.01)
(52) U.S. Cl. .......................... 403/23; 211/183
(58) Field of Classification Search .............. 403/11, 403/23, 231, 234, 236, 241, 262
See application file for complete search history.

(56) References Cited

U.S. PATENT DOCUMENTS

| | | | |
|---|---|---|---|
| 3,912,083 A * | 10/1975 | Jay | 211/50 |
| D318,077 S * | 7/1991 | Larsen et al. | D21/505 |
| D330,056 S * | 10/1992 | Pagel | D21/505 |
| D335,154 S * | 4/1993 | Knudsen | D21/504 |
| D335,160 S * | 4/1993 | Knudsen | D21/505 |
| 5,363,617 A * | 11/1994 | Miller | 52/288.1 |
| D353,629 S * | 12/1994 | Skov | D21/504 |
| 5,419,649 A * | 5/1995 | Gilb | 403/231 |
| 5,913,778 A * | 6/1999 | Hying et al. | 52/40 |
| 6,260,237 B1 * | 7/2001 | McCue et al. | 16/404 |
| 6,279,756 B1 * | 8/2001 | Walter et al. | 211/26 |
| 6,405,884 B1 * | 6/2002 | Dion | 211/189 |
| 6,609,620 B1 * | 8/2003 | Kautz et al. | 211/183 |
| 6,672,017 B2 * | 1/2004 | Larson | 52/170 |
| 6,929,571 B2 * | 8/2005 | Jesch et al. | 473/479 |
| 7,274,573 B2 * | 9/2007 | Sevakivi | 361/721 |
| 7,559,180 B2 * | 7/2009 | Ajiki | 52/655.1 |
| 2001/0047975 A1 * | 12/2001 | Lazas et al. | 211/183 |
| 2003/0235480 A1 * | 12/2003 | Thomson et al. | 410/87 |
| 2004/0149671 A1 * | 8/2004 | Krueger et al. | 211/183 |
| 2004/0195741 A1 * | 10/2004 | Jones | 267/136 |
| 2007/0221596 A1 * | 9/2007 | Rioux | 211/191 |
| 2008/0006596 A1 * | 1/2008 | Palmeri | 211/189 |
| 2008/0149581 A1 * | 6/2008 | Clarke et al. | 211/183 |
| 2010/0236155 A1 * | 9/2010 | Lanza | 52/58 |

* cited by examiner

*Primary Examiner* — Joshua Kennedy
(74) *Attorney, Agent, or Firm* — John E. Vandigriff

(57) ABSTRACT

A cover device is used to cover bolts and welded plate edges on a lumber stacking rack to prevent damage to the lumber when it is placed in the stacking rack.

11 Claims, 8 Drawing Sheets

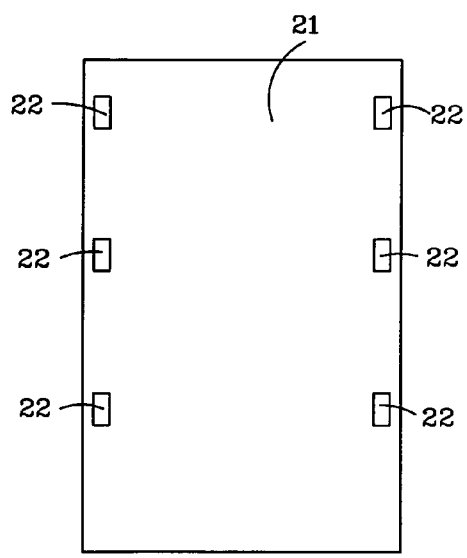
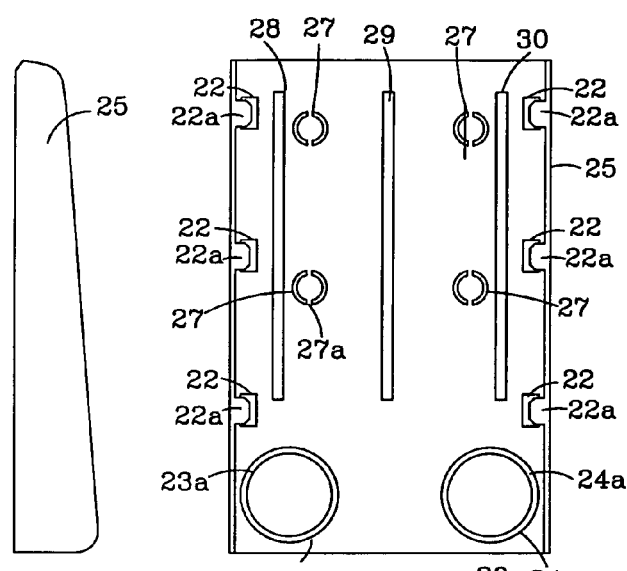
FIG. 2  FIG. 3  FIG. 4
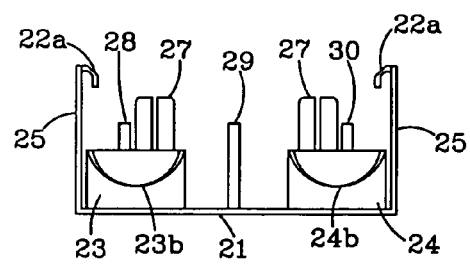
FIG. 4a

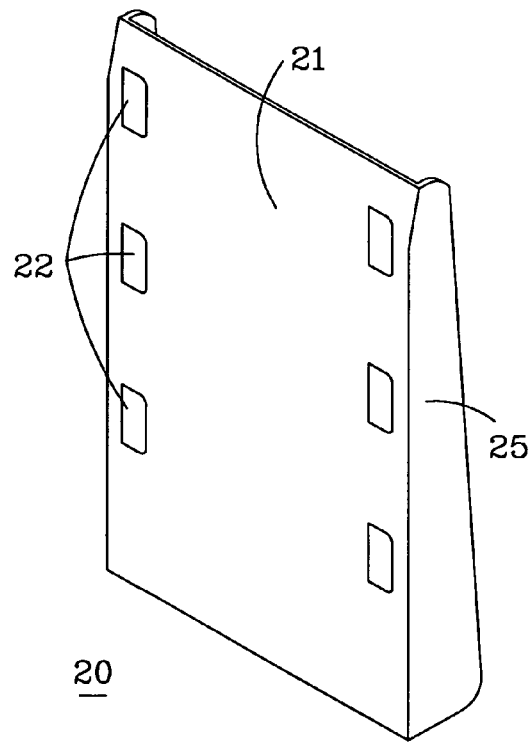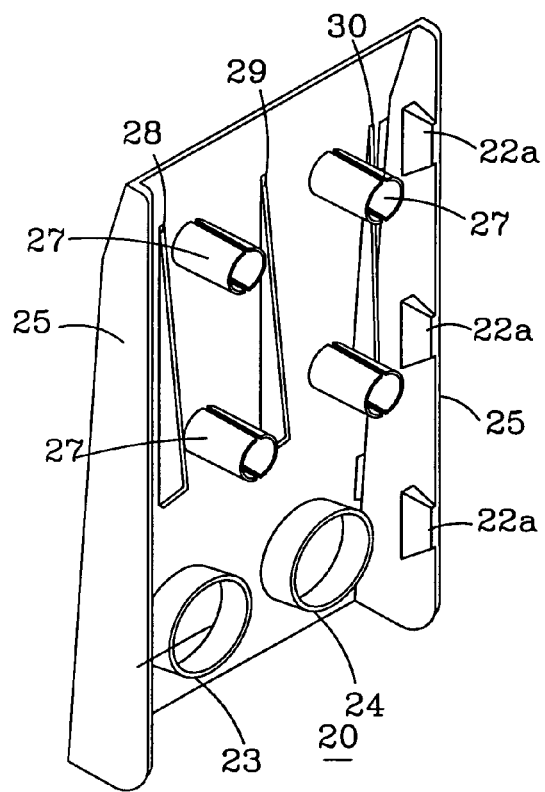
FIG. 5a
FIG. 5b

LUMBER STORAGE AND STACKING PROTECTION DEVICE

PRIORITY

Priority is claimed from Provisional Application Ser. No. 60/967,021, filed Sep. 4, 2007.

FIELD OF THE INVENTION

The invention relates to the stacking and storing of lumber, and to an apparatus for the prevention of damage to the lumber when it is placed in a lumber storage rack.

BACKGROUND OF THE INVENTION

Lumber is usually stored inside buildings at stores that sell building material and related products. The lumber is stored in cantilevered rack that have extended arms forming a bin or bay, with several banded stacks of lumber in each rack. The extended are usually attached to vertical members by bolts and welded joints. When the lumber is moved into the rack, and lowered onto the extended arms, the lumber may be moved against the bolts and welded edges, damaging the lumber.

SUMMARY OF THE INVENTION

The invention is a cover apparatus that is placed over the bolts and welded areas that attached the extended arms of the lumber storage rack to the vertical members. The cover is placed over the attachment area of the extended arms so that when lumber is placed in the rack and lowered, the edges of the lumber will not engage and contact the bolts and welded area. The covers have a slight inclined slanting surface which, when contacted by the lumber, will allow the lumber to move downward and slightly away from the vertical members preventing damage to the lumber.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 2 is a front view of the cover device of the invention;
FIG. 3 is a side view of the cover device of the invention;
FIG. 4 is a back view of the cover device of the invention;
FIG. 4a is an end view of the cover device of the invention;
FIGS. 5a and 5b are isometrics view of the cover device.

DESCRIPTION OF A PREFERRED EMBODIMENT

Figure 1:
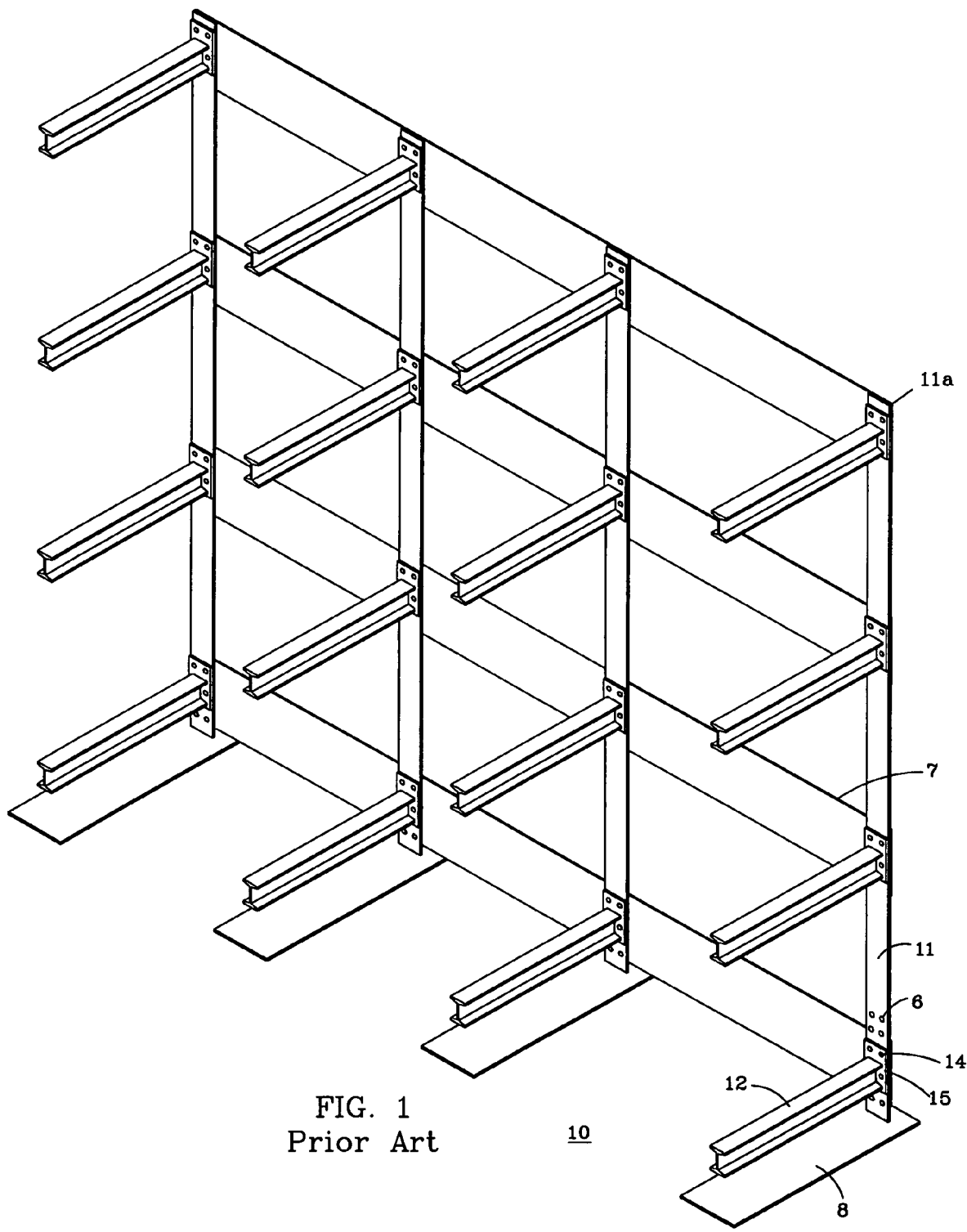
FIG. 1 Shows a storage rack of the prior art.

FIG. 1 shows a prior art storage rack 10 that has a plurality of vertical members 11, horizontal members 7 and base members 8. The extended arms 12 are secured to the vertical members 11 by bolts, for example bolts 14 extending through plate 15 and vertical member 11. Plate 15 may also be welded to vertical member 11. There may be several holes 6 in vertical member 11 to accept extensions 27 in the cover device 20 (FIG. 4).

FIG. 2 is a front view of the cover device 20. In the front surface 21 is a series of openings 22 on each side of the cover. FIG. 3 is a side view of the cover device 20 which has extended sides 25 on each side.

FIG. 4 is a back view of the cover device 20 showing The two extended sides 25, three ridges 28, 29 and 30, and the openings 22. There are three extension latches 22a on the inside edges of the extended sides 25. The extensions 22a are used to secure the cover device to, for example, the vertical member 11(FIG. 1) of the storage rack. The extensions 23 and 24 have circular ridges 23a and 24a which extend from the back side of front surface 21. Ridges 23a, 24a, around areas 23 and 24, and the three ridges 28, 29 and 30 space the front side 21 of cover device 20 from vertical member 11, to which it is attached. The extension 23 and 24, for example, surround bolts 14a and 14b (See FIG. 6). In the event that the plate 15 is welded to plate 11, then the extensions 23 and 24 could be eliminated, and the cover device 20 could have a smaller depth, and sides 25 could be shorter from front to back There are several tubular extensions 27, which extend through, for example, openings 6 in vertical member 11 (FIG. 1) to help hold cover device 20 in place. Tubular extensions have openings 27a down it length to make them flexible when extending through openings 6.

FIG. 4a is an end view of cover device 20. The front plate 21 is shown with the sides 25. The latches 22a are shown on the upper edge (as illustrated) of sides 25. Ridges 28, 29 and 30 are shown spaces on the back side of front plate 21. Extensions 23 and 24 may have a lower side on one side of the extension wall. The lower sides or areas are designated as 23b and 24b.

FIG. 5 is an isometric front view of cover device 20 showing front plate 21, sides 25, and openings 22.

Figure 6:
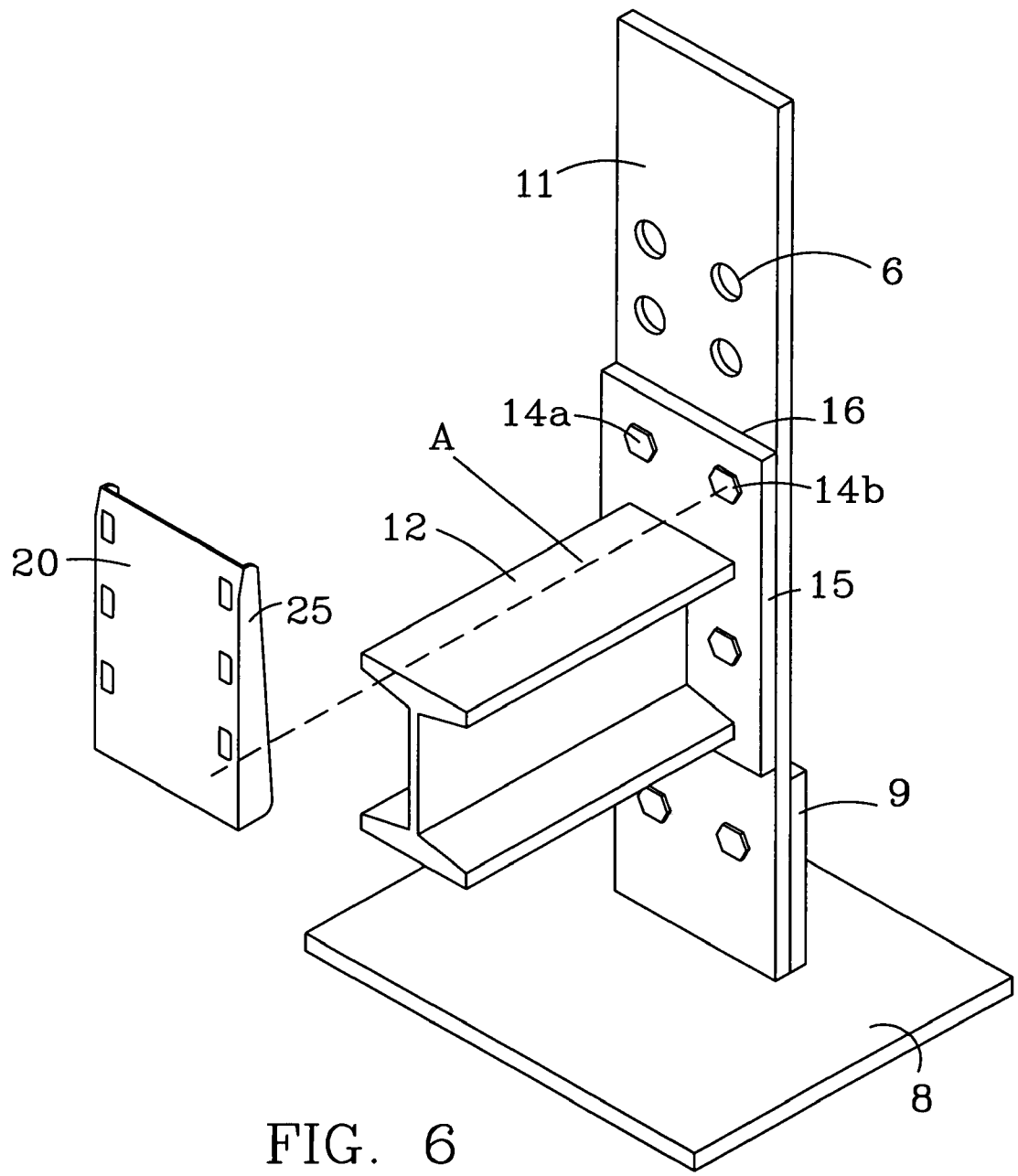
FIG. 6 is a partial view of a storage rack showing the cover device before it is placed over the bolts.

FIG. 5b is an isometric back view of cover device 20. Attached to the front surface 21 are two sides 25 extend from surface 21. There are three tapered supports 28, 29 and 30 that are used to space surface of cover device 20 from the vertical member 11 to which it is attached. Bolts on the vertical member are positioned in 23 and 24. There are four tubular extensions 27 which extends through openings 6 in vertical member 11 (FIG. 6). Latch fingers 22a attached cover 20 to vertical member 11. There are latch fingers on both sides 25, but only three are illustrated in FIG. 5b.

FIG. 6 shows a partial view of storage rack 10, with the vertical member 11 secured to base 8, and attached to a plate 9. Extended arm 12 is attached to plate 15, which is secured to vertical member 11 by bolts 14. Plate 15 may also be secured to vertical member 11 by welding, for example along edge 16. Cover device is shown spaced in front of storage rack 10 with line A showing that when it mounted to rack 10. Bolts 14a and 14b are positioned in ridges 23 and 24 (FIG. 5b), respectively.

Figure 7:
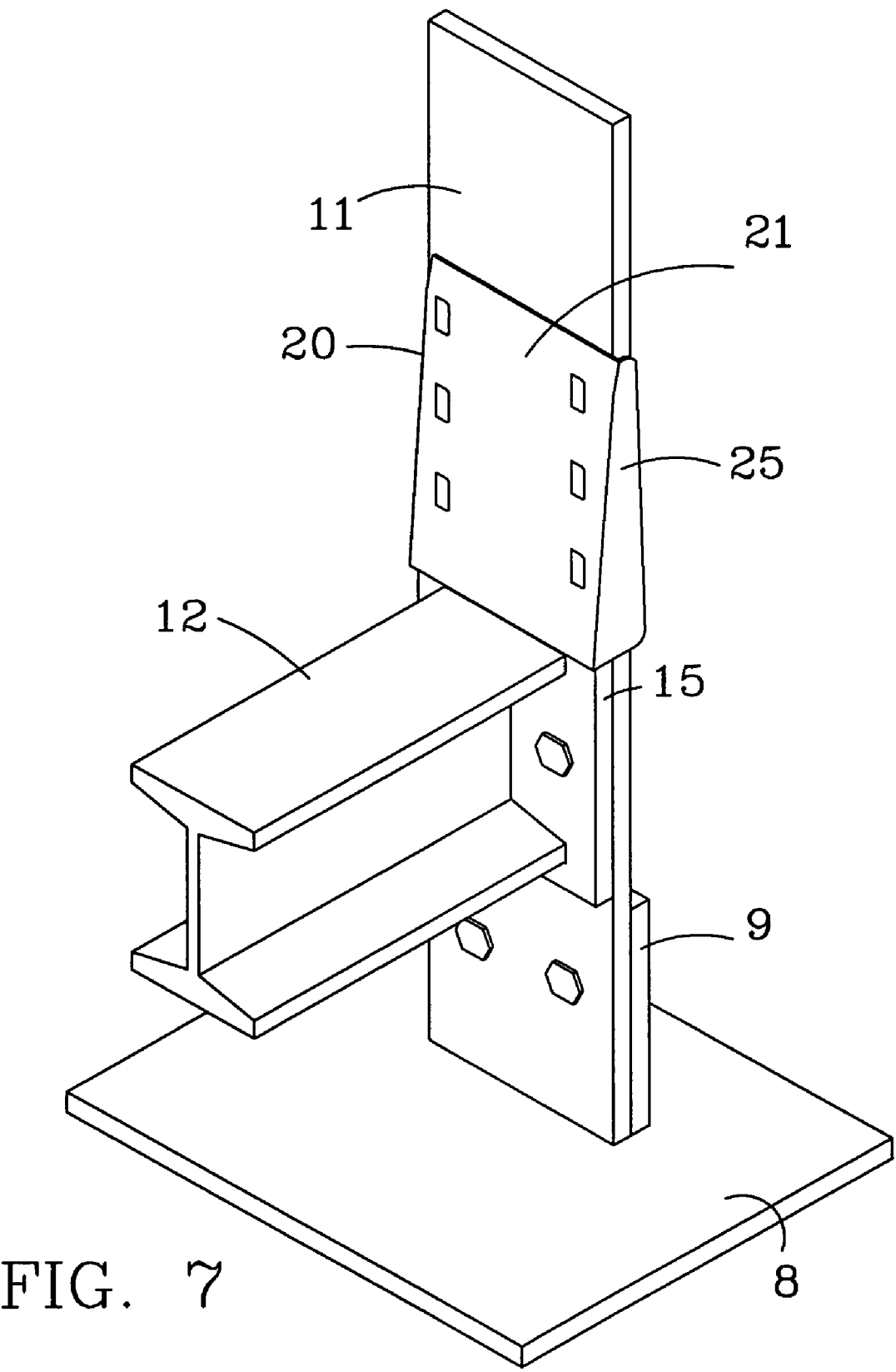
FIG. 7 is a partial view of a storage rack showing the cover device placed over the bolts.

FIG. 7 shows a portion of a storage rack with the cover device mounted on the rack. The cover device is secured to the vertical member with the bolts 14a and 14b in the circular ridges 23 and 24 (FIG. 5b). The sides 25 extend back over the edges of vertical member 11, and are attached thereto by the extension latches 22a which extend from the sides 25. Also, the tubular extensions 27 (FIG. 4) extend through openings 6 (FIG. 6) in vertical member 11.

Figure 8:
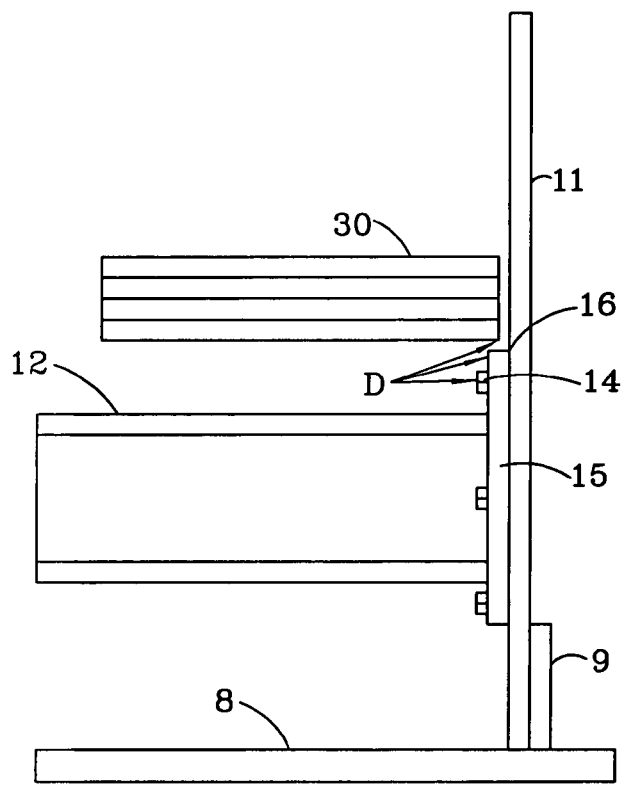
FIG. 8 is side partial view of a storage rack showing lumber adjacent to the bolts and welded area.

FIG. 8 is a side view of the partial storage rack illustrated in FIG. 6. Shown is the horizontal arm 12 attached to plate 15, which is bolted to vertical member 11. Vertical member 11 is attached to base 8 and support plate 9. Three arrows D are shown pointed to the edge of a lumber stack 30, the corner of plate 15, and bolt 14. When lumber stack 30 is lowered on to horizontal arm 12, the edge of the lumber stack may be damaged as it is lowered and the edge of the lumber stack comes down on the edge of plate 15 and bolts 14. Although a stack of lumber is illustrated, it could be storage containers, for example cardboard boxes.

Figure 9:
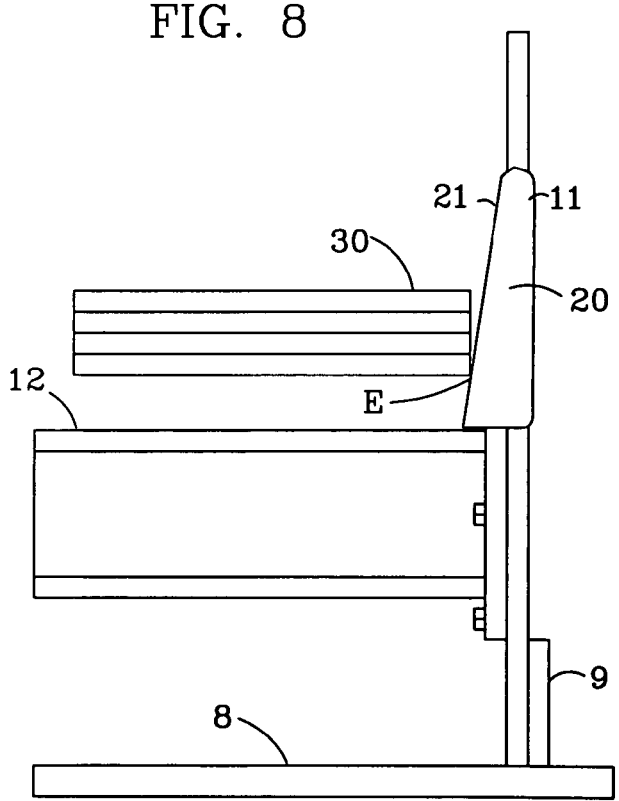
FIG. 9 is a side partial view of the storage rack with the cover.

FIG. 9 shows the cover device 20 mounted on the vertical member 11 and over the plate 15 and bolts 14. When lumber is stored in the lumber rack, the edge of the E of the lumber 30 engages the surface 21 of cover device 20, and will slide downward on to the upper surface of horizontal arm 12. This prevents the edge of the lumber, or other items being placed on the rack, from being damages when it is loaded into the storage rack.

In some storage racks, the top of a vertical member may be shorter, or provide less space for a cover device, for example, FIG. 1, vertical member to end, 11a, is shorter than the space above the other horizontal members, for example the space above horizontal member 12. To provide a modified cover device for the shorter space, cover device 40, FIGS. 10a and 10b, is modified from cover device 20 illustrated in FIGS. 2-4.

Figure 10B:
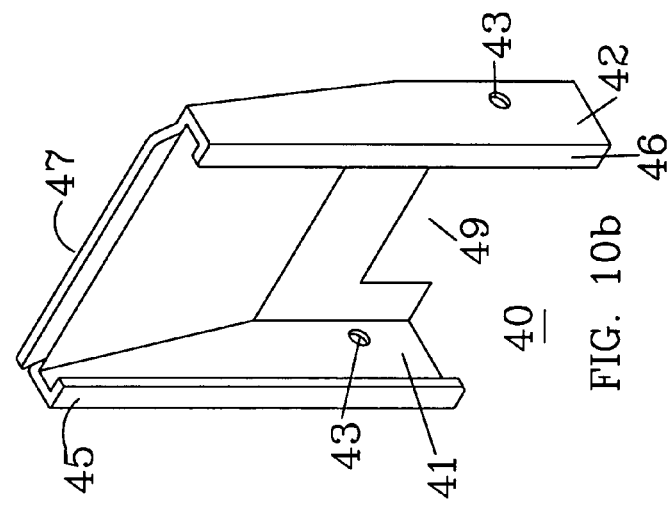
FIGS. 10a and 10b illustrate a cover device.
Figure 10A:
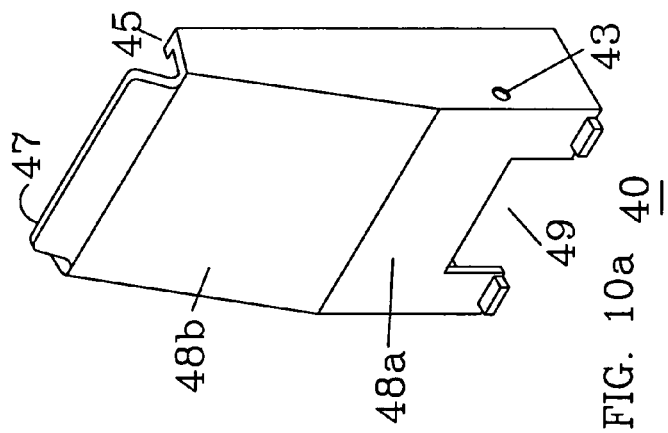

FIGS. 1a and 10b show the front and back of cover device 40. Cover device 40 has a front panel with vertical part 48a and inclined part 48b. Opening 49 allows horizontal member 63 of a rack (FIG. 15) to extend through cover device 40. There is also a further inclined part 47.

There are two sides parts 41 and 42m each of which have an extension 45 and 46, respectively, that extend toward each other and form an opening 51 through a vertical member of a storage rack to extend through opening 51. See FIG. 15.

Figure 12:
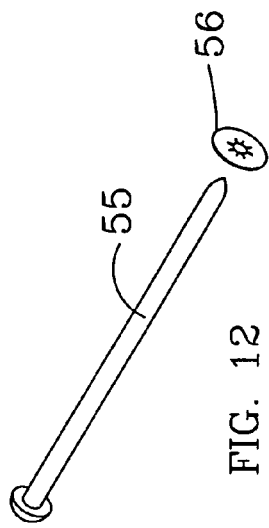
FIG. 12 is a securing pin.

There are openings 43 in each of the sides 41 and 42. Pin 55, FIG. 12, extends through these openings to help secure cover device to the top of a vertical member. When cover device 40 is placed over vertical member 60, FIG. 15, pin 55 extends under bolts 62 (FIG. 14) and holds vertical member 40 in place. Fastener 56 is placed on the end of pin 55 to hold it in place.

Figure 11:
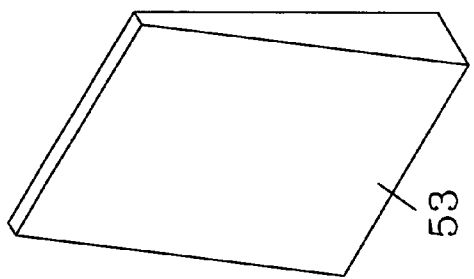
FIG. 11 shows a support device.

In FIG. 11, is shown a support device 53. Support device 53 is placed on top 65 of plate 61 (FIG. 14) to provide support for the front panel 48b of cover device 40.

Figure 13:
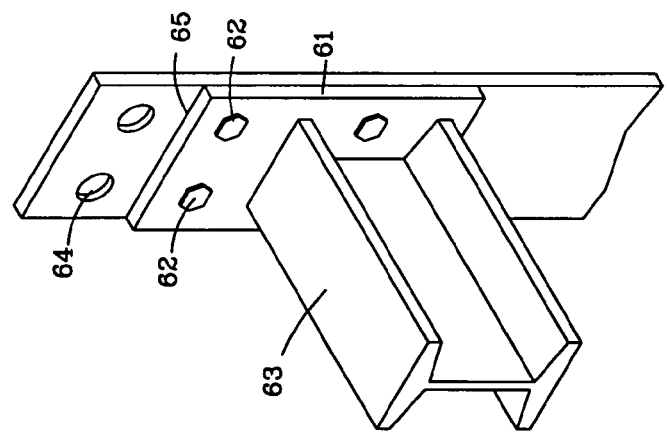
FIG. 13 is a partial view of a top portion of a storage rack.

FIG. 13 shows a top end of a vertical member of a storage rack. Vertical member 60 has a vertical member 63 secured to vertical member 60 by plate 61. Plate 61 is secured to vertical member 61 by, for example, bolts 62.

Figure 14:
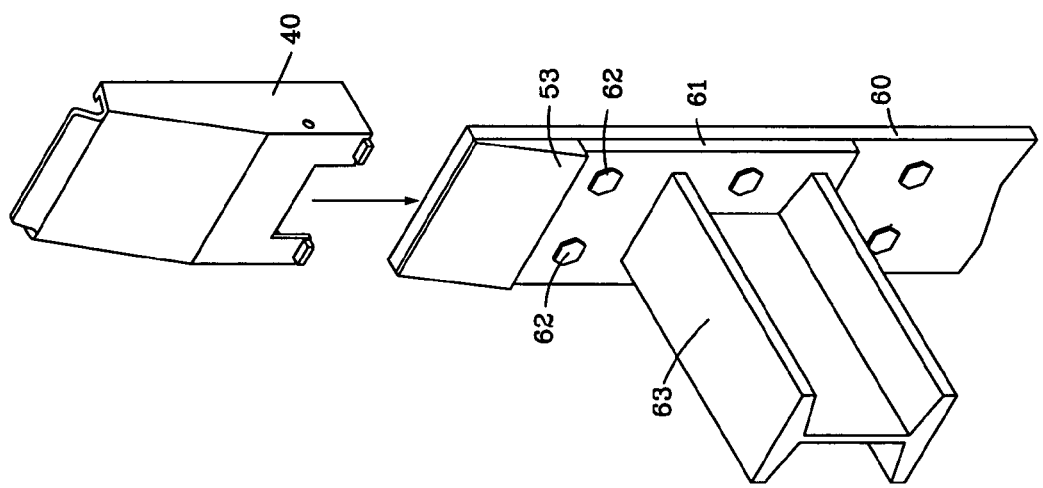
FIG. 14 show the partial view of the storage rack and a cover device.

FIG. 14 shows a portion of a vertical member with support device 53 mounted on the top of plate 61, and cover device 40 is placed over vertical member 60 before it is placed downward over the end of vertical member 61 and support 53.

Figure 15:
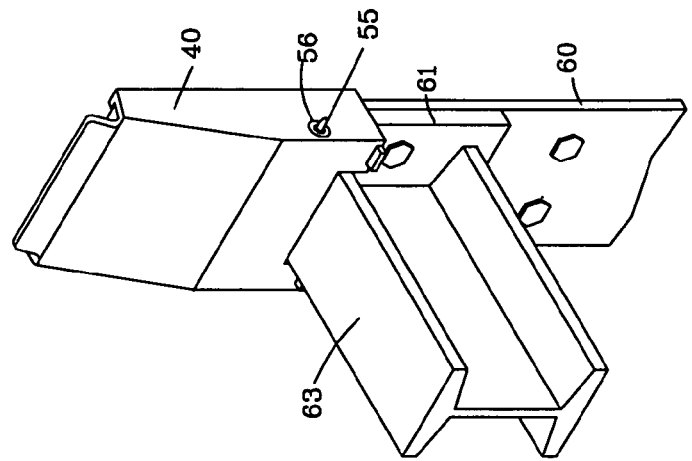
FIG. 15 shows the partial view of a the storage rack with a cover in place.

FIG. 15 shows cover device 40 mounted on vertical member 60, and secured in place by pin 55 and fastener 56.

What is claimed:

1. A lumber storage and stacking protection device comprising:
   a storage rack comprising vertical members and extended arms attached thereto at attachment areas by fastening means; and
   a protective cover, mounted on said vertical members above the extended arms over each attachment area, having a flat, slightly inclined surface having front and back sides, such that when contacted by the material, said surface will allow the material to move downward and slightly away from the vertical members preventing damage to the material by said fastening means when placed in the storage rack;
   side members extending from opposite sides of the flat surface, and
   securing tabs on the side members securing
   the protective cover to the vertical member above the extended arm of the storage rack.

2. The lumber storage and stacking device according to claim 1, at least two openings within said side members for positioning bolts within the protective cover.

3. The lumber storage and stacking device according to claim 1, including tapered ridges between the side members on the back side of the flat surface for mounting the protective cover and the flat surface at an inclined angle.

4. The lumber storage and stacking device according to claim 1, including cylindrical extensions extending from the back side of the flat surface for positioning the protective cover over holes in the mounted surface.

5. The lumber storage and stacking device according to claim 4, wherein the front plate has a vertical portion and an inclined portion, said vertical portion having an opening therein.

6. The lumber storage and stacking device according to claim 4, wherein each side member has an opening therein for inserting a securing pin.

7. The lumber storage and stacking device according to claim 4, including a separate support device positioned behind the front plate.

8. The lumber storage and stacking device according to claim 7, wherein the separate support device has a triangular configuration.

9. A lumber storage and stacking protection device comprising:
   a storage rack comprising vertical members and extended arms attached thereto at attachment areas by fastening means; and
   a protective cover having at least a front plate and two inclined side plates having ridges thereon securing the protective cover to the vertical members on the storage rack above the extended arms; and
   said front plate being inclined such that when contacted by the material, said front plate will allow the material to move downward and slightly away from the vertical members preventing damage to the material by said fastening means when placed on the extended arms of the storage rack.

10. The lumber storage and stacking device according to claim 9, including a second inclined portion adjacent to the two inclined side plates.

11. A lumber storage and stacking protection device comprising:

a storage rack comprising vertical members and extended arms, on which materials and containers are placed, attached thereto at attachment areas by plates and bolts extending through the plates and the vertical members;

a protective cover having an inclined front portion placed over said plates edges and said bolts on the storage rack, such that when contacted by the material, said surface will allow the material to move downward and slightly away from the vertical members preventing damage to the material by said plates edges and said bolts when placed on the extended arms of the storage rack; and side portions attached to the front portion securing the cover to the storage rack vertical members above said extended arms.

* * * * *